O. W. BRENIZER.
CABLE SUPPORT.
APPLICATION FILED APR. 30, 1920.
1,373,165.
Patented Mar. 29, 1921.
2 SHEETS—SHEET 1.
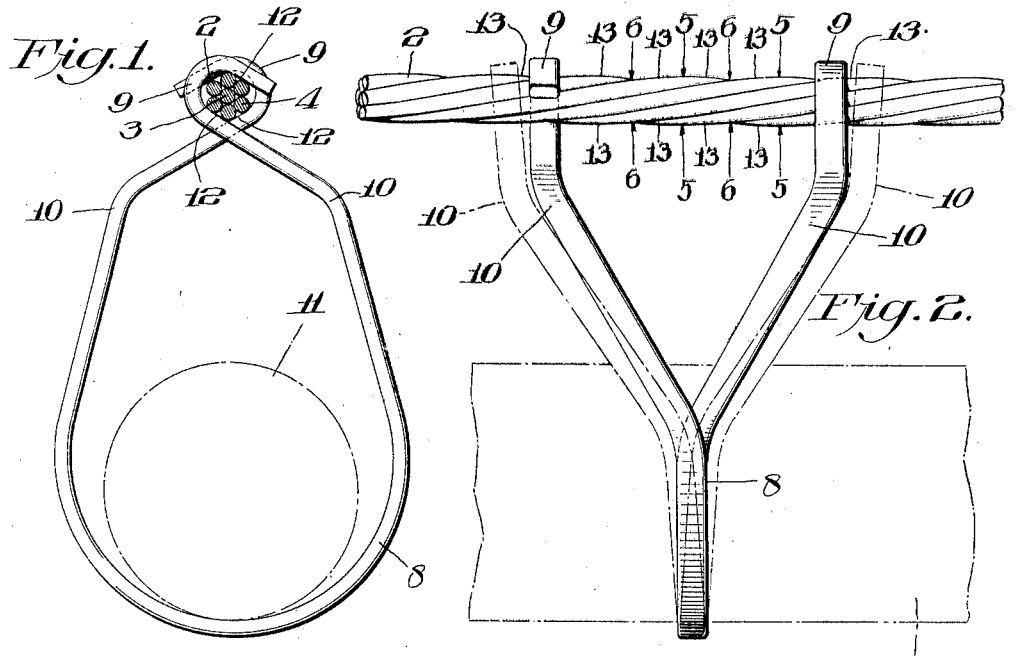
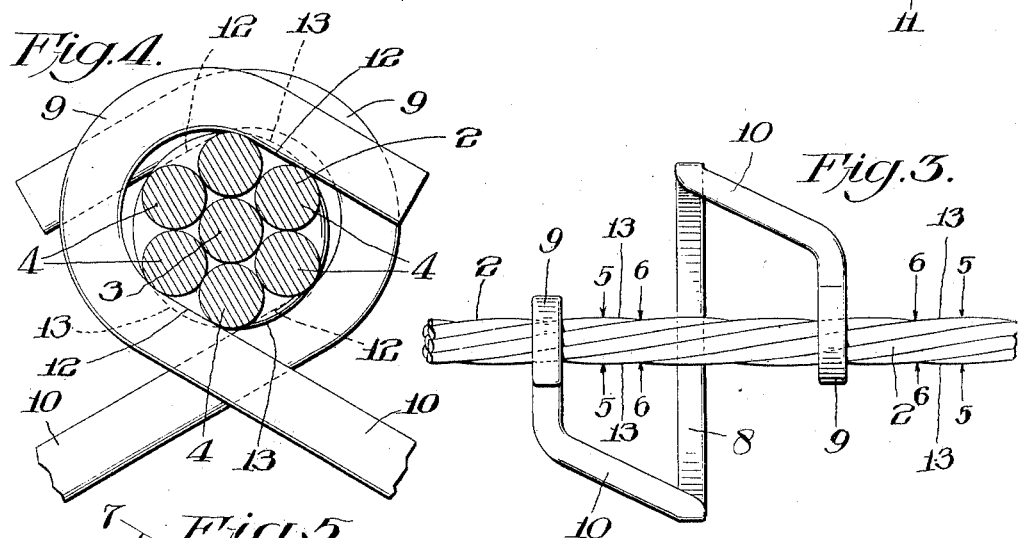
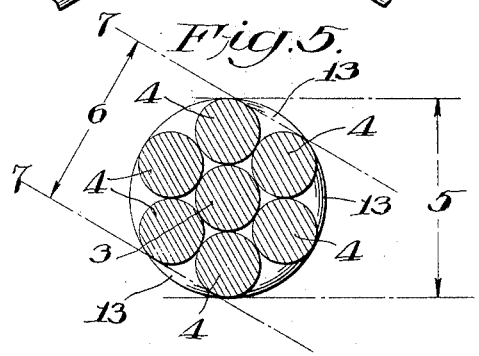
Inventor
Orson W. Brenizer,
by
Attorney O. W. BRENIZER.
CABLE SUPPORT.
APPLICATION FILED APR. 30, 1920.
1,373,165.  Patented Mar. 29, 1921.
2 SHEETS—SHEET 2.
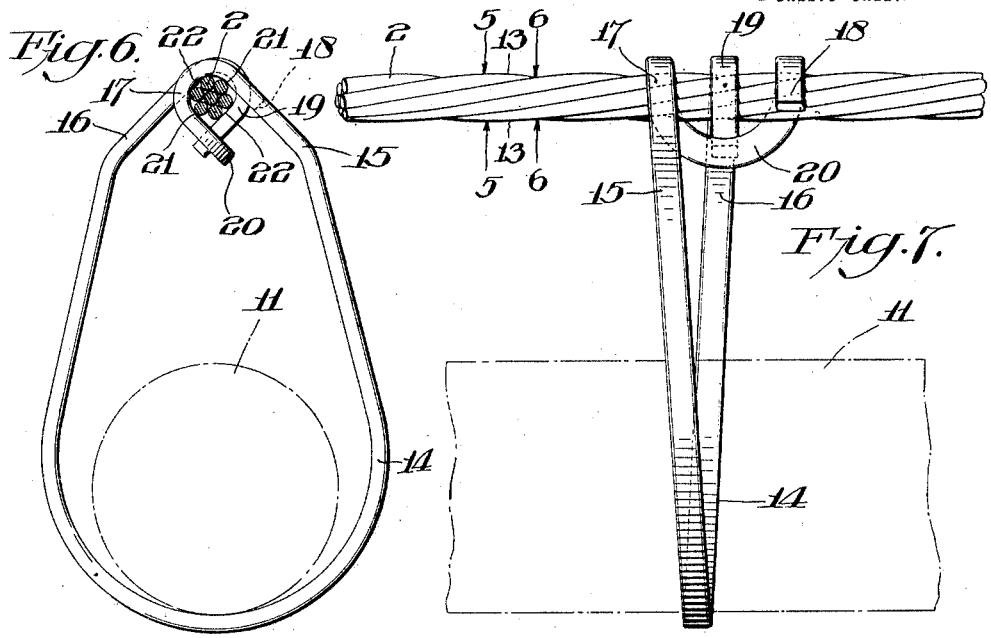
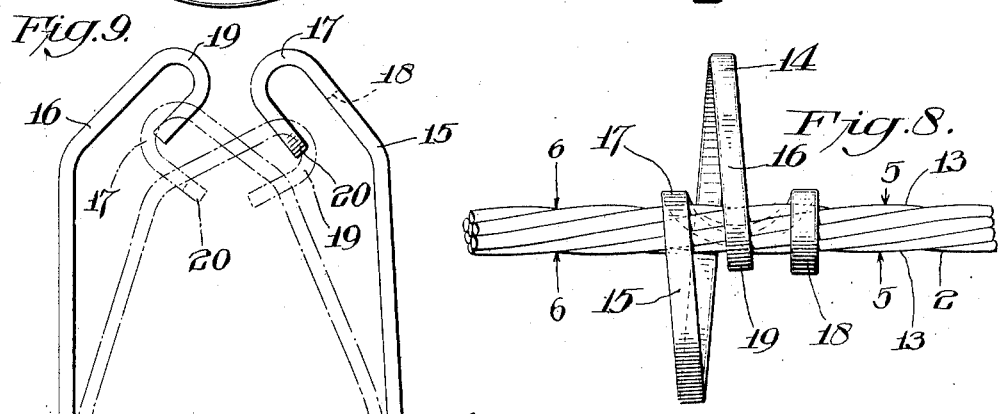
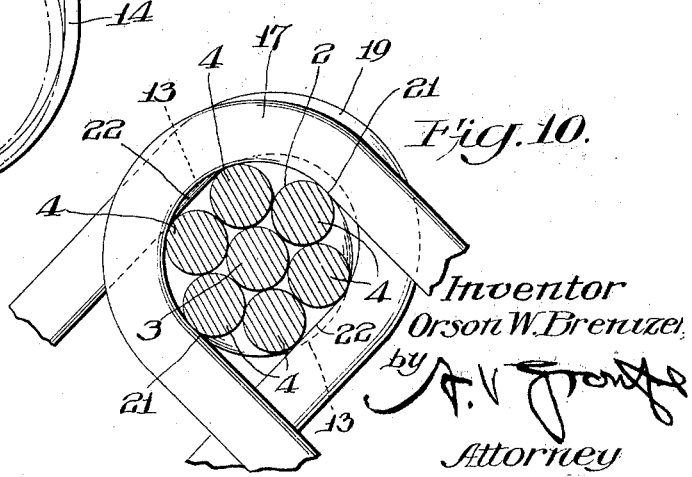
Inventor
Orson W. Brenizer
by
Attorney

UNITED STATES PATENT OFFICE.

ORSON W. BRENIZER, OF PHILADELPHIA, PENNSYLVANIA, ASSIGNOR OF ONE-FIFTH TO ANDREW V. GROUPE, OF PHILADELPHIA, PENNSYLVANIA.

CABLE-SUPPORT.

1,373,165.  Specification of Letters Patent.  Patented Mar. 29, 1921.

Application filed April 30, 1920. Serial No. 377,745.

*To all whom it may concern:*

Be it known that I, ORSON W. BRENIZER, a citizen of the United States, residing at Philadelphia, in the county of Philadelphia and State of Pennsylvania, have invented certain new and useful Improvements in Cable-Supports, of which the following is a specification.

This invention relates to improvements in cable supports adapted to be hung at intervals upon a supporting or messenger wire and to receive and support a cable.

The supporting or messenger wires generally used in this art comprise a plurality of strands twisted around a central or core strand thereby providing the messenger wire with relatively large and small diameters in alternate succession and with intermediate beveled or inclined shoulder portions.

One of the objects of the present invention is to utilize the said shoulder portions as a means to prevent displacement of a cable support longitudinally of the supporting or messenger wire by associating therewith a cable support of novel, simple and efficient construction and combining the parts of the cable support with the parts of the supporting or messenger wire in a novel and advantageous manner to accomplish the desired prevention of longitudinal displacement.

Another object of the invention is to provide the cable support with novel spring pressed means to engage the supporting or messenger wire which means will be pressed into gripping engagement with the supporting wire by the spring action of the cable support intending to resume a normal condition from which it was sprung when applied to the supporting wire.

A further object of the invention is to provide a cable support which will not only be held in proper position upon the supporting or messenger wire, while the cable is being applied to the support, but which is so related to the supporting wire that it will be thereby prevented from moving relatively thereto when the cable, suspended by the support, is swayed by the wind and thus avoid the objectionable wear which usually occurs between the cable supports and their supporting or messenger wires, as is well known to persons skilled in this art.

With the foregoing and related objects in view, the invention consists in the novel construction and combination and arrangement of parts hereinafter described and claimed.

In the accompanying drawings illustrating the invention,

Figure 1 is a transverse section through a supporting or messenger wire having a cable support applied thereto embodying my invention.

Fig. 2 is a side view thereof.

Fig. 3 is a top view thereof.

Fig. 4 is an enlarged transverse section of the messenger wire having the hooks of the cable support shown in Fig. 1 applied thereto.

Fig. 5 is an enlarged transverse section of the messenger wire.

Figs. 6, 7 and 8 are views similar to Figs. 1, 2 and 3, respectively, showing a modified form of the invention.

Fig. 9 is a view of the cable support illustrated in Fig. 6, in the normal condition thereof, and showing by dotted lines the position to which the parts are sprung to receive the messenger wire.

Fig. 10 is an enlarged transverse section of the messenger wire having the hooks of the cable support shown in Fig. 6 applied thereto.

Referring to the drawings, 2 designates the supporting or messenger wire which comprises a central or core strand 3 and six outer strands 4 lying side by side and twisted in spiral form around the core strand 3, as clearly shown in the drawings. A messenger wire of this character has relatively large and small diameters, which occur in alternate succession longitudinally of the wire, as indicated at 5 and 6, respectively, in Figs. 2 and 3, and which extend continuously in spiral form around the wire 2 from end to end thereof, following the lines of its twisted strands 4. These alternating large and small diameters are also indicated at 5 and 6, respectively, in Fig. 5, where it will be observed that each of two parallel lines 7 which touch opposite sides of the messenger wire at one of the small diameters 6 thereof also touch two of its twisted strands 4.

The cable support illustrated in Figs. 1 to 4, inclusive, comprises a cable-receiving loop 8 extending beneath the supporting or messenger wire 2, and having hooks 9 formed on the respective end portions 10 of the loop and facing different directions and hooked over and around the messenger wire 2 to connect the cable support thereto in a manner to permit it to act as the connecting element for suspending a cable, indicated at 11 in Figs. 1 and 2, from the messenger wire.

The side arms 10 of the loop 8 diverge upwardly and outwardly logitudinally of the messenger wire 2 so that the hooks 9 will be spaced apart, and the hooks 9 are disposed parallel or substantially parallel to each other so that they will extend at right angles or substantially at right angles to the messenger wire 2.

The oppositely disposed faces 12 of each hook 9 extend parallel to each other and the distance between the faces 12 of each hook 9 is less than the large diameter 5 of the messenger wire 2 and, preferably, but slightly in excess of or substantially equal to the small diameter 6 of the messenger wire 2, for a purpose hereinafter described.

The cable support is formed of spring wire and in its normal condition, before it is applied to the messenger wire 2, the end portions 10 of the cable-receiving loop 8 thereof are flared outwardly to a greater extent than that shown by full lines in Fig. 2 and about to the extent shown by the dotted lines in Fig. 2. In this normal condition of cable support, the hooks 9 are canted slightly so that they diverge upwardly and outwardly and so that when they are sprung toward each other they will assume the parallel relationship shown by full lines in Fig. 2, and so that they will thereafter tend to resume their canted relationship as the cable support tends to resume its normal condition for a purpose presently appearing.

In applying the cable support to the messenger wire 2 it is grasped by the hand of the line man or operative in a manner to permit the end portions 10 of the loop 8 to be sprung toward each other by the pressure of the hand. One hook 9 is then hooked over and around the messenger wire 2 from one side thereof at one of its small diameters 6. This done, the end portions 10 of the loop 8 are sprung toward each other, by hand pressure, to lessen the space between the hooks 9 from that shown by dotted lines to that shown by full lines in Fig. 2, and to bring the remaining hook 9 into registry with one of the small diameters 6 of the messenger wire 2, whereupon the said remaining hook 9 is hooked over and around the messenger wire from the opposite side thereof and at the small diameter 6 with which it was sprung into registry.

After both hooks 9 have been thus applied to the messenger wire 2, the cable support is released in the position shown by full lines in Fig. 2; and, as it tends to resume its normal condition, as shown by dotted lines, the hooks 9 tend to separate. It will be understood that the loop 8 connecting the hooks 9 prevents the relative turning thereof around the axis of the messenger wire 2. Therefore, the spring action of the support in tending to resume its normal condition and in thereby tending to separate the hooks 9 forces them in opposition to each other against the adjacent inclined or beveled shoulder portions 13 which connect the small diameters 6 with the large diameters 5 of the messenger wire 2, thereby locking the support upon the messenger wire, in a manner to prevent its accidental displacement therefrom, by the spring action of the support as it tends to resume its normal condition.

When the cable support is thus applied to the messenger wire 2 and a cable 11 is drawn through the loop 8 thereof in the usual manner the engagement of the hooks 9 with the shoulder portions 13 prevent displacement of the support longitudinally of the messenger wire; and the tendency of the cable to move the lower portion of the loop 8 with it while being drawn therethrough causes the hooks 9 to firmly grip the messenger wire.

When the hooks 9 are engaged with the messenger wire as described, each of the opposite, inner parallel faces 12 of each hook 9 is adjacent to and adapted to engage two of the strands 4 of the messenger wire 2 and thereby prevent the turning or pivoting of the cable support on the messenger wire when the cable is swayed by the wind and thus prevent the friction between them which is incident to such pivoting or turning. This is an important advantage because it prevents the galvanized coating with which the parts are provided from wearing off and the consequent corrosion of the foundation metal by the exposure thereof to the elements.

The upward and outward divergence of the end portions 10 of the support provides sufficient space between the hooks 9 to permit the passage of a cable between them and into the loop 8 when it is desired to apply the cable support to a cable before applying it to the messenger wire, as, for example, in renewing some of the supports suspending a cable from a messenger wire. The upward and outward divergence of the end portions 10 also braces and stiffens the entire structure, placing one of the end portions 10 under tension and the other under compression by the action of a cable against the same when it is drawn through the loop 8.

In the modification shown in Figs. 6 to 10, inclusive, the cable support is formed of spring wire and comprises a loop 14 having end portions 15 and 16, hooks 17, 18 and 19, and an arm 20.

The hooks 17 and 19 face different directions and form continuations of the end portions 15 and 16, respectively, and they are adapted to be hooked around the messenger wire 2 from opposite sides thereof. The arm 20 forms a continuation of the hook 17, and the hook 18 forms a continuation of the arm 20, and it extends therefrom on lines following the lines of the hook 17 in spaced relation thereto, and it is adapted to be hooked around the wire 2 with the hook 17. The hook 19 is adapted to be hooked around the messenger wire 2 between the hooks 17 and 18, as clearly illustrated.

The oppositely disposed faces 21 of the hook 19 extend parallel to each other, and the distance between them is less than the large diameter 5 of the messenger wire 2 and, preferably, but slightly in excess of or substantially equal to the small diameter 6 of the wire 2, similarly to one of the hooks 9 of the form shown in Fig. 1 and for the same purpose; and the distance between the oppositely disposed faces 22 of each hook 17 and 18 is equal to or slightly in excess of the larger diameter 5 of the messenger wire 2 to permit them to occupy any desired position on the wire 2.

When the support is applied to the messenger wire 2, the loop 14 extends beneath the same and is adapted to receive a cable, as indicated at 11 in Figs. 6 and 7, the hooks 17 and 18 are hooked around the wire 2 from one side thereof, the hook 19 is hooked around the wire 2 from the opposite side thereof, and the free end portion of the hook 19 extends between the wire 2 and the arm 20.

The normal condition of the support is shown by full lines in Fig. 6, and, in applying the support to the wire 2, the loop 14 is grasped by hand and the device is moved relatively to the wire 2 to cause it to enter the loop 14. The parts of the device are then sprung into the position shown by dotted lines in Fig. 9. This done, the hooks 17 and 18, as a unit, are hooked around the wire 2 from one side thereof. The support is then moved along the messenger wire 2 until the hook 19 is brought into registry with one of the small diameters 6 of the wire 2 and the hand pressure holding the support in the condition shown by dotted lines in Fig. 8 is relieved, permitting the device to return part way to the normal condition shown by full lines in Fig. 9. During this return action of the device, the hook 19 is hooked around the wire 2 from the opposite side and at the small diameter thereof with which it was brought into registry, and the free end portion of the hook 19 enters between the wire 2 and the arm 20 and comes to rest in engagement with, or in close proximity to, said arm, as clearly shown in Figs. 6, 7 and 8. The engagement of the hooks 17, 18 and 19 with the wire 2 prevents the complete return of the device to the normal condition shown by full lines in Fig. 9, and thereafter the tendency of the device to resume said normal condition causes the hooks 17, 18 and 19 to firmly grip the messenger wire 2.

When the support is applied to the wire 2, the free end portion of the hook 19 engaging the arm 20 locks the hooks 17 and 18 upon the wire 2 and prevents the accidental disengagement of the device therefrom.

As the hooks 17, 18 and 19 all engage the wire 2 above and below the horizontal center thereof, and as the hooks 17 and 18 are locked upon the wire 2 by the engagement of the hook 19 with the arm 20, the entire device is prevented from tilting, or its tilting is confined within very narrow and unobjectionable limits when the cable 11 is drawn therethrough in either direction; and any tendency of the device to tilt under the action of the cable against the lower portion of the loop 14 as it is drawn therethrough will cause the arm 20 engaging the free side of the hook 19 to force the free side of the hook 19 toward the opposite side thereof and thereby force the opposing faces 22 thereof into firm gripping engagement with the messenger wire 2 at the small diameter 6 thereof, and thus prevent any liability of any displacement of the device longitudinally of the wire 2.

I am aware that cable supports have been provided with hooks which face different directions and which are hooked around the messenger wire from opposite sides thereof, and also that hooks have been pressed into engagement with the messenger wire by the spring action of the support in tending to resume a normal condition; but I believe that I am the first to provide a construction in which a messenger wire, having alternating relatively large and small diameters, is combined with a cable support having a hook which is hooked around the messenger wire at one of the small diameters thereof and which has two opposing inner faces adjacent to opposite sides of the messenger wire, the distance between the opposing faces being less than the large diameter of the messenger wire, whereby the shoulder formed between the large and small diameters of the messenger wire will act as an abutment to prevent displacement of the hook longitudinally of the messenger wire irrespective of whether or not the hook is pressed into engagement with the messenger wire by any spring action of the support, and this is one of the important features of my present invention to which I broadly lay claim. With this broad feature present the invention is capable of a wide range of modification without departing from my invention.

I claim:—

1. The combination with a supporting wire having relatively large and small diameters in alternate succession, of a cable support suspended therefrom and having a cable-receiving opening therein and having a part embracing the supporting wire and having two opposing faces adjacent to opposite sides thereof at one of its small diameters, the distance between said faces being less than the adjacent large diameter of the supporting wire.

2. The combination with a supporting wire having relatively large and small diameters in alternate succession forming intermediate shoulder portions, of a cable support formed of spring metal and comprising a cable-receiving loop extending beneath the supporting wire, means to connect one end portion of said loop to the supporting wire, and a hook connected to the other end portion of said loop and hooked over and around the supporting wire and having two opposing faces adjacent to opposite sides thereof at one of its small diameters, the distance between said faces being less than the adjacent large diameter of the supporting wire, and said device, in tending to resume a normal condition from which it was sprung, pressing said hook into engagement with a part of the supporting wire.

3. The combination with a supporting wire having relatively large and small diameters in alternate succession forming intermediate shoulder portions, of a cable support formed of spring metal and comprising a cable-receiving loop extending beneath the supporting wire and having hooks formed on the respective ends thereof and hooked over and around the supporting wire, each hook having two opposing faces adjacent to opposite sides of the supporting wire at one of its small diameters, and said device, in tending to resume a normal condition from which it was sprung, tending to move said hooks relatively and in opposition to each other and thereby pressing them against adjacent shoulder portions of the supporting wire.

4. The combination of a supporting wire formed of twisted strands which provide the wire with relatively large and small diameters in alternate succession, of a cable support suspended therefrom and having a cable-receiving opening therein and having a hook embracing the supporting wire and having two substantially parallel opposing faces adjacent to opposite sides thereof at one of its small diameters, the distance between said faces being less than the adjacent large diameter of the supporting wire, and each of said faces being in close proximity to two strands of the supporting wire whereby said hook is prevented from moving longitudinally of the supporting wire or turning about the axis thereof.

In testimony whereof I affix my signature hereto.

ORSON W. BRENIZER.